(12) United States Patent
Wang

(10) Patent No.: US 9,470,834 B2
(45) Date of Patent: Oct. 18, 2016

(54) LIGHT GUIDE PLATE AND MANUFACTURING METHOD THEREOF

(71) Applicant: Shenzhen China Star Optoelectronics Technology Co., Ltd., Shenzhen, Guangdong (CN)

(72) Inventor: Jiangfeng Wang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 31 days.

(21) Appl. No.: 14/428,962

(22) PCT Filed: Feb. 9, 2015

(86) PCT No.: PCT/CN2015/072478
§ 371 (c)(1),
(2) Date: Mar. 17, 2015

(87) PCT Pub. No.: WO2016/086534
PCT Pub. Date: Jun. 9, 2016

(65) Prior Publication Data
US 2016/0154167 A1    Jun. 2, 2016

(51) Int. Cl.
*F21V 7/04* (2006.01)
*F21V 8/00* (2006.01)

(52) U.S. Cl.
CPC ........... *G02B 6/0041* (2013.01); *G02B 6/0061* (2013.01); *G02B 6/0065* (2013.01)

(58) Field of Classification Search
CPC . G02B 6/0041; G02B 6/0061; G02B 6/0065
USPC ............................... 362/617, 616, 97.1, 97.2
See application file for complete search history.

(56) References Cited

U.S. PATENT DOCUMENTS

| | | | | |
|---|---|---|---|---|
| 6,512,626 B1* | 1/2003 | Schmidt | ................ | G09F 9/372 204/450 |
| 2009/0135469 A1* | 5/2009 | Lee | ....................... | G02B 6/0065 359/296 |
| 2009/0180282 A1* | 7/2009 | Aylward | .............. | G02B 6/0021 362/245 |
| 2010/0302799 A1* | 12/2010 | Rosberg | ............... | G02B 6/0041 362/602 |
| 2012/0026742 A1* | 2/2012 | Fang | .................... | G02B 6/0043 362/355 |

(Continued)

FOREIGN PATENT DOCUMENTS

CN        104155715 A  * 11/2014

OTHER PUBLICATIONS

Machine English Translation of CN104155715A Nov. 19, 2014 Xia Long et al.*

*Primary Examiner* — Anh Mai
*Assistant Examiner* — Glenn Zimmerman
(74) *Attorney, Agent, or Firm* — Andrew C. Cheng

(57) ABSTRACT

A light guide plate includes a light incident surface formed on a lateral side, a reflection surface formed on a bottom, and a light exit surface formed on a top. The light guide plate includes a plurality of voids formed therein at one side close to the reflection surface. Each of the voids contains therein a plurality of high reflectivity particles. The light guide plate has a reflection surface that is a planar surface to help achieve total reflection and includes a plurality of voids that contain air and high reflectivity particles sealed therein arranged at the side adjacent to the reflection surface so that a portion of the light entering the light guide plate through a light incident surface and irradiating the voids is reflected by the voids to project out through a light exit surface.

6 Claims, 4 Drawing Sheets

(56) References Cited

U.S. PATENT DOCUMENTS

| | | | | |
|---|---|---|---|---|
| 2012/0140513 A1* | 6/2012 | Shibata | ............... | G02B 6/0035 362/602 |
| 2013/0033754 A1* | 2/2013 | Lin | ................... | B29D 11/0073 359/599 |
| 2013/0100696 A1* | 4/2013 | Brick | ....................... | F21K 9/00 362/603 |
| 2014/0049983 A1* | 2/2014 | Nichol | ................ | G02B 6/0018 362/610 |
| 2015/0268531 A1* | 9/2015 | Wang | ..................... | G02F 1/167 359/296 |

* cited by examiner

Step 1: providing a light guide plate (1) and a mold (3), wherein the light guide plate (1) comprises a light incident surface (41) formed on a lateral side of the light guide plate, a bottom surface (42') formed on a bottom of the light guide plate, and a light exit surface (43) formed on a top of the light guide plate;

Step 2: placing the bottom surface (42') of the light guide plate (1) toward the mold (3) in order to mate the mold (3) to form a plurality of recessed cavities (111) through pressing the bottom surface (42');

Step 3: removing the light guide plate (1) from the mold (3);

Step 4: arranging the bottom surface (42') of the light guide plate (1) to face upward and filling a plurality of high reflectivity particles (12) into each of the recessed cavities (111);

Step 5: forming a sealing layer (10) on the bottom surface (42') of the light guide plate (1) so that each of the recessed cavities (111) contains a plurality of high reflectivity particles (12) sealed therein to thereby form a plurality of voids (11) containing air and a plurality of high reflectivity particles (12) filled therein and a surface of the sealing layer (10) distant from the voids (11) forms a reflection surface (42), thereby completing the manufacture of the light guide plate (1).

Fig. 3

LIGHT GUIDE PLATE AND MANUFACTURING METHOD THEREOF

BACKGROUND OF THE INVENTION

1. Field of the Invention

The present invention relates to the field of displaying technology, and in particular to a light guide plate and a manufacturing method thereof.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise a backlight module and a liquid crystal panel mounted to the backlight module.

The principle of operation of the liquid crystal panel is that liquid crystal molecules are interposed between two parallel glass substrates and a plurality of tiny horizontal and vertical wires are arranged between the two glass substrates, wherein the liquid crystal molecules are controlled to change direction through an application of electricity so as to refract out light emitting from the backlight module to generate an image. Since the liquid crystal panel itself does not emit light, light must be provided from the backlight module in order to normally display an image. The backlight modules can be classified in two types, namely a side-edge backlight module and a direct backlight module, according to the site where light gets incident. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident surface at one side of the light guide plate and is projected out of a light exit surface of the light guide plate, after being reflected and diffused, to pass through an optic film assembly so as to form a planar light source for the liquid crystal panel.

As shown in FIG. 1, most of the medium- or small-sized light guide plates 100 use recessed or raised geometric grid dots 110 on a bottom thereof. Light from an LED light source 200 and transmitting through the light incident surface 410 into the light guide plate 100, before reaching the grid dots 110, is subjected to total reflection inside the light guide plate 100. Total reflection will be destructed for light reaching the grid dots 110 so that a portion of the light projects out from the light exit surface 430 that is formed on the upper surface of the light guide plate 100, as indicated by light a illustrated in FIG. 1. Another portion of the light is given off from the reflection surface 420 of the lower surface of the light guide plate 100, as indicated by light b of FIG. 1. The light b that emits from the lower surface of the light guide plate 100 is of no use. This leads to a waste of light, lowering down the light utilization of the light guide plate 100 and also increasing the cost of backlighting.

SUMMARY OF THE INVENTION

An object of the present invention is to provide a light guide plate, which has a reflection surface that is a planar surface to help achieve total reflection and comprises a plurality of voids formed therein at the side close to the reflection surface and hermetically containing therein air and high reflectivity particles so that a portion of the light that enters the light guide plate through a light incident surface and irradiates the voids is reflected by the void to project out through a light exit surface as effective light, while another portion of the light enters the voids and reflected by the high reflectivity particles contained in the voids to project out of the light exit surface to increase light reflectivity inside the light guide plate thereby improving light utilization of the light guide plate and thus enhancing backlighting brightness and lowering down backlighting cost.

Another object of the present invention is to provide a manufacturing method of a light guide plate, which injects high reflectivity particles into recessed cavities formed in the reflection surface side of a light guide plate through pressing and then applies a sealing layer to achieve sealing so as to form voids for increasing light reflectivity inside the light guide plate and improving light utilization.

To achieve the above object, the present invention provides a light guide plate, which comprises a light incident surface formed on a lateral side of the light guide plate, a reflection surface formed on a bottom of the light guide plate, and a light exit surface formed on a top of the light guide plate. The light guide plate comprises a plurality of voids formed therein at one side close to the reflection surface. Each of the voids contains therein a plurality of high reflectivity particles.

The plurality of voids are arranged on a plane that is parallel with the reflection surface.

The voids that are located close to a lateral side of the light guide plate that is distant from the light incident surface are distributed more densely than the voids that are located close to a lateral side adjacent to the light incident surface; or alternatively, the voids at the lateral side distant from the light incident surface have sizes that are greater than sizes of the voids at the lateral side adjacent to the light incident surface.

The high reflectivity particles are made of barium sulfate.

The present invention also provides a manufacturing method of a light guide plate, which comprises the following steps:

(1) providing a light guide plate and a mold, wherein the light guide plate comprises a light incident surface formed on a lateral side of the light guide plate, a bottom surface formed on a bottom of the light guide plate, and a light exit surface formed on a top of the light guide plate;

(2) placing the bottom surface of the light guide plate toward the mold in order to mate the mold to form a plurality of recessed cavities through pressing the bottom surface;

(3) removing the light guide plate from the mold;

(4) arranging the bottom surface of the light guide plate to face upward and filling a plurality of high reflectivity particles into each of the recessed cavities; and (5) forming a sealing layer on the bottom surface of the light guide plate so that each of the recessed cavities contains a plurality of high reflectivity particles sealed therein to thereby form a plurality of voids containing air and a plurality of high reflectivity particles filled therein and a surface of the sealing layer distant from the voids forms a reflection surface, thereby completing the manufacture of the light guide plate.

In step (5), a material of the sealing layer is the same as a material of the light guide plate.

In step (1), the mold comprises a plurality of raised sections for forming the recessed cavities.

In step (4), the high reflectivity particles are made of barium sulfate.

In step (5), the voids at a side distant from the light incident surface are distributed more densely than the voids at a side adjacent to the light incident surface.

In step (5), the voids at a side distant from the light incident surface are larger in size than the voids at a side adjacent to the light incident surface.

The present invention further provides a light guide plate, which comprises a light incident surface formed on a lateral side of the light guide plate, a reflection surface formed on a bottom of the light guide plate, and a light exit surface formed on a top of the light guide plate, the light guide plate comprising a plurality of voids formed therein at one side close to the reflection surface, each of the voids containing therein a plurality of high reflectivity particles;

wherein the plurality of voids are arranged on a plane that is parallel with the reflection surface; and wherein the high reflectivity particles are made of barium sulfate.

The efficacy of the present invention is that the present invention provides a light guide plate, which has a reflection surface that is a planar surface to help achieve total reflection and comprises a plurality of voids that contain air and high reflectivity particles sealed therein arranged at the side adjacent to the reflection surface so that a portion of the light entering the light guide plate through a light incident surface and irradiating the voids is reflected by the voids to project out through a light exit surface and serve as effective light, while another portion enters the voids and is reflected by the high reflectivity particles contained in the voids to project out through the light exit surface so as to increase light reflectivity inside the light guide plate thereby enhancing light utilization of the light guide plate and thus increasing backlighting brightness and lowering down backlighting cost. The present invention provides a manufacturing method of a light guide plate, which forms voids by first forming, through pressing, recessed cavities in the light reflection surface side of the light guide plate and then filling therein high reflectivity particles followed by sealing with application of a sealing layer so as to increase light reflectivity inside the light guide plate thereby enhancing light utilization. The method is simple, has a low cost, and provides a better result.

BRIEF DESCRIPTION OF THE DRAWINGS

The technical solution, as well as other beneficial advantages, of the present invention will be apparent from the following detailed description of embodiments of the present invention, with reference to the attached drawing. In the drawing:

FIG. 3 is a flow chart illustrating a manufacturing method of a light guide plate according to the present invention;

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
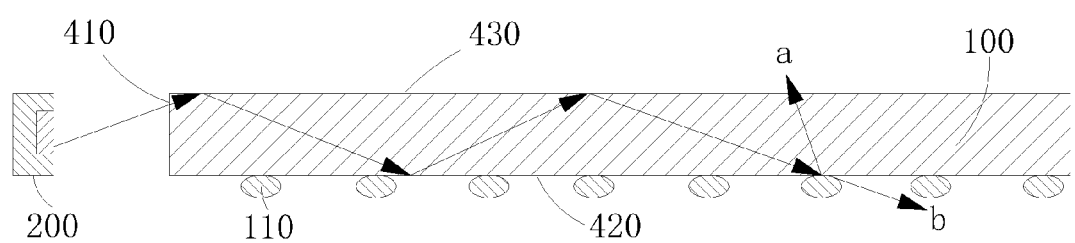
FIG. 1 is a schematic view showing a conventional light guide plate.
Figure 2:
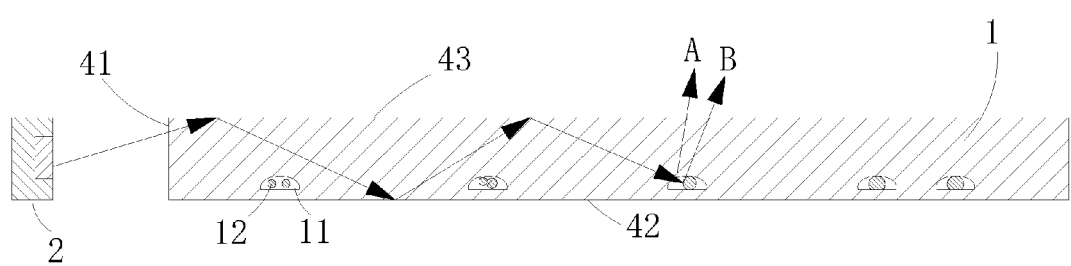
FIG. 2 is a schematic view showing a light guide plate according to the present invention.

Referring to FIG. 2, the present invention provides a light guide plate, which comprises a light incident surface 41 formed on a lateral side of the light guide plate 1, a reflection surface 42 formed on a bottom of the light guide plate 1, and a light exit surface 43 formed on a top of the light guide plate 1. The light guide plate 1 comprises a plurality of voids 11 formed therein at one side close to the reflection surface 42. Each of the voids 11 contains therein a plurality of high reflectivity particles 12. The voids 11 that are located close to the lateral side of the light guide plate 1 that is distant from the light incident surface 41 are distributed more densely than the voids 11 that are located close to the lateral side adjacent to the light incident surface 41, or alternatively, the voids 11 at the lateral side distant from the light incident surface 41 have sizes that are greater than sizes of the voids 11 at the lateral side adjacent to the light incident surface 41.

Preferably, the plurality of voids 11 are arranged on a plane that is parallel with the reflection surface 42.

Preferably, the high reflectivity particles 12 are made of barium sulfate.

As shown in FIG. 2, light emitting from a light-emitting diode (LED) light source 2 transmits through the light incident surface 41 of the light guide plate 1 to enter the light guide plate 1. For light that does not irradiate the voids 11, the light is subjected to total reflection inside the light guide plate 1. For light that irradiates the voids 11, the total reflection is destructed and a portion of the light is reflected by the voids 11 to project out through the light exit surface 43 of the top surface of the light guide plate 1, serving as effective light, as indicated by light A shown in FIG. 2; and another portion of the light enters the voids 11 and is reflected by the high reflectivity particles 12 contained in the voids 11 to project out through the light exit surface 43 of the top surface of the light guide plate 1, as indicated by light B shown in FIG. 2. The voids 11 that are filled therein with air and the high reflectivity particles 12 help increase light reflectivity inside the light guide plate so as to enhance light utilization of the light guide plate 1 thereby increasing backlighting brightness and lowering down backlighting cost. The voids 11 can be made more densely distributed or larger in size at the side distant from the LED light source 2 in order to make light distributed uniformly inside the light guide plate 1.

Figure 4:
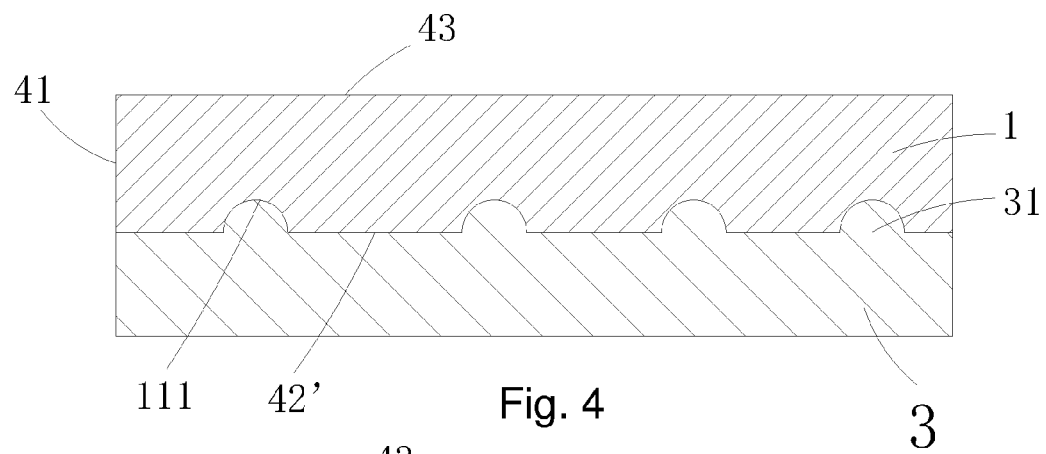
FIG. 4 is a schematic view illustrating steps (1) and (2) of the manufacturing method of the light guide plate according to the present invention.

Referring to FIG. 3, the present invention also provides a manufacturing method of a light guide plate, which comprises the following steps:

Step 1: referring to FIG. 4, providing a light guide plate 1 and a mold 3, wherein the light guide plate 1 comprises a light incident surface 41 formed on a lateral side of the light guide plate 1, a bottom surface 42' formed on a bottom of the light guide plate 1, and a light exit surface 43 formed on a top of the light guide plate 1.

Specifically, the mold 3 comprises a plurality of raised sections 31 for forming recessed cavities 111. To form the recessed cavities 111 of predetermined distribution density or predetermined sizes, the raised sections 31 are provided on the mold 3 to be gradually densely arranged or to be gradually increased in size.

Step 2: referring to FIG. 4, placing the bottom surface 42' of the light guide plate 1 toward the mold 3 in order to mate the mold 3 to form a plurality of recessed cavities 111 through pressing the bottom surface 42'.

Figure 5:
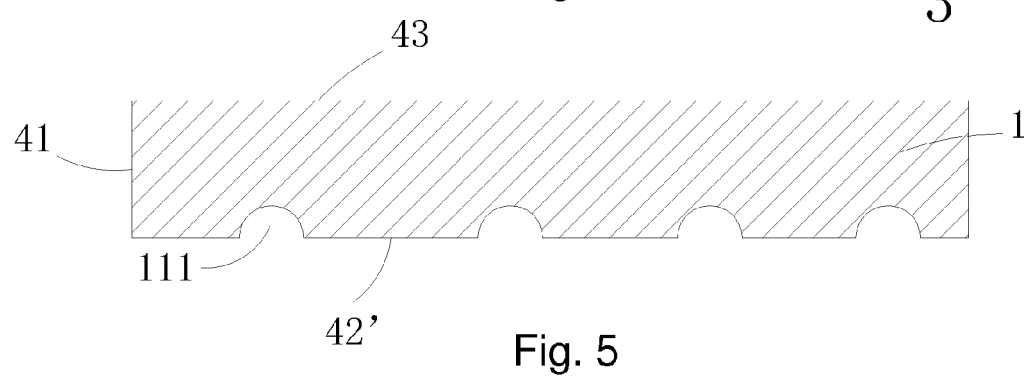
FIG. 5 is a schematic view illustrating step (3) of the manufacturing method of the light guide plate according to the present invention.

Step 3: referring to FIG. 5, removing the light guide plate 1 from the mold 3.

Figure 6:
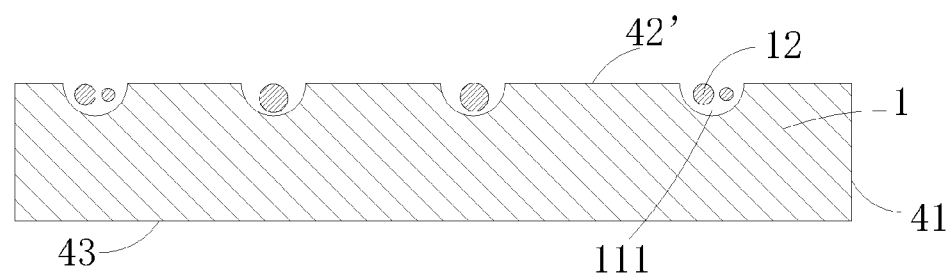
FIG. 6 is a schematic view illustrating step (4) of the manufacturing method of the light guide plate according to the present invention.

Step 4: referring to FIG. 6, arranging the bottom surface 42' of the light guide plate 1 to face upward and filling a plurality of high reflectivity particles 12 into each of the recessed cavities 111.

Preferably, the high reflectivity particles 12 are made of barium sulfate.

Further, the voids 11 at the side distant from the light incident surface 41 can be arranged to be more densely distributed than the voids 11 at the side adjacent to the light incident surface 41, or the voids 11 at the side distant from the light incident surface 41 are arranged to have larger sizes than the voids 11 at the side adjacent to the light incident surface 41 in order to make light distributed more uniformly in the light guide plate.

Figure 7:
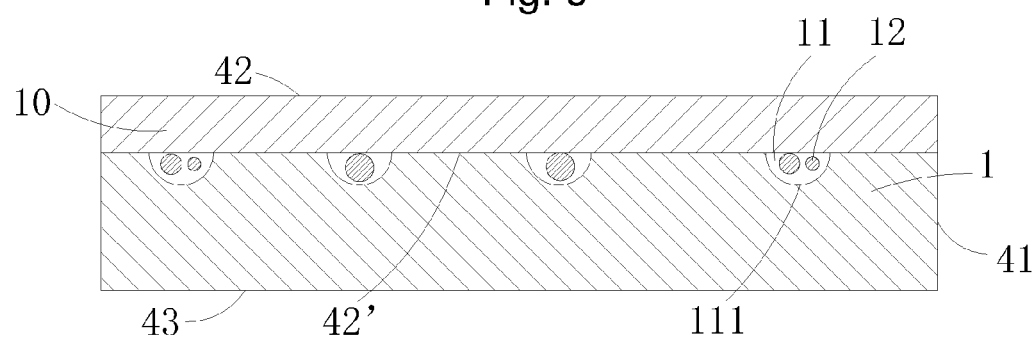
FIG. 7 is a schematic view illustrating step (5) of the manufacturing method of the light guide plate according to the present invention.

Step 5: referring to FIG. 7, forming a sealing layer 10 on the bottom surface 42' of the light guide plate 1 so that each of the recessed cavities 111 contains a plurality of high reflectivity particles 12 sealed therein to thereby form a plurality of voids 11 containing air and a plurality of high reflectivity particles 12 filled therein and a surface of the sealing layer 10 distant from the voids 11 forms a reflection surface 42, thereby completing the manufacture of the light guide plate 1.

Preferably, the material of the sealing layer 10 is identical to the material of the light guide plate 1.

The method forms the voids 11 that contain air and the high reflectivity particles 12 filled therein and the reflection surface 42 by first forming, through pressing, the recessed cavities 111 in the side of the light guide plate 1 corresponding to the bottom surface 42' and then filling therein the high reflectivity particles 12 followed by sealing with application of the sealing layer 10. Light emitting from the LED light source 2 transmits through the light incident surface 41 of the light guide plate 1 to enter the light guide plate 1. For light that does not irradiate the voids 11 but reaches the reflection surface 42, the light is subjected to total reflection inside the light guide plate 1. For light that irradiates the voids 11, the total reflection is destructed and a portion of the light is reflected by the voids 11 to project out through the light exit surface 43 of the top surface of the light guide plate 1, serving as effective light; and another portion of the light enters the voids 11 and is reflected by the high reflectivity particles 12 contained in the voids 11 to project out through the light exit surface 43 of the top surface of the light guide plate 1 so as to increase light reflectivity inside the light guide plate 1 and thus enhance light utilization of the light guide plate 1 thereby increasing backlighting brightness and lowering down backlighting cost. The manufacturing method is simple, has a low cost, and provides a better result.

In summary, the present invention provides a light guide plate, which has a reflection surface that is a planar surface to help achieve total reflection and comprises a plurality of voids that contain air and high reflectivity particles sealed therein arranged at the side adjacent to the reflection surface so that a portion of the light entering the light guide plate through a light incident surface and irradiating the voids is reflected by the voids to project out through a light exit surface and serve as effective light, while another portion enters the voids and is reflected by the high reflectivity particles contained in the voids to project out through the light exit surface so as to increase light reflectivity inside the light guide plate thereby enhancing light utilization of the light guide plate and thus increasing backlighting brightness and lowering down backlighting cost. The present invention provides a manufacturing method of a light guide plate, which forms voids by first forming, through pressing, recessed cavities in the light reflection surface side of the light guide plate and then filling therein high reflectivity particles followed by sealing with application of a sealing layer so as to increase light reflectivity inside the light guide plate thereby enhancing light utilization. The method is simple, has a low cost, and provides a better result.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A manufacturing method of a light guide plate, comprising the following steps:
   (1) providing a light guide plate and a mold, wherein the light guide plate comprises a light incident surface formed on a lateral side of the light guide plate, a bottom surface formed on a bottom of the light guide plate, and a light exit surface formed on a top of the light guide plate;
   (2) placing the bottom surface of the light guide plate toward the mold in order to mate the mold to form a plurality of recessed cavities through pressing the bottom surface;
   (3) removing the light guide plate from the mold;
   (4) arranging the bottom surface of the light guide plate to face upward and filling a plurality of high reflectivity particles into each of the recessed cavities; and
   (5) forming a sealing layer on the bottom surface of the light guide plate so that each of the recessed cavities contains a plurality of high reflectivity particles sealed therein to thereby form a plurality of voids containing air and a plurality of high reflectivity particles filled therein and a surface of the sealing layer distant from the voids forms a reflection surface, thereby completing the manufacture of the light guide plate.

2. The manufacturing method of the light guide plate as claimed in claim 1, wherein in step (5), a material of the sealing layer is the same as a material of the light guide plate.

3. The manufacturing method of the light guide plate as claimed in claim 1, wherein in step (1), the mold comprises a plurality of raised sections for forming the recessed cavities.

4. The manufacturing method of the light guide plate as claimed in claim 1, wherein in step (4), the high reflectivity particles are made of barium sulfate.

5. The manufacturing method of the light guide plate as claimed in claim 1, wherein in step (5), the voids at a side distant from the light incident surface are distributed more densely than the voids at a side adjacent to the light incident surface.

6. The manufacturing method of the light guide plate as claimed in claim 1, wherein in step (5), the voids at a side distant from the light incident surface are larger in size than the voids at a side adjacent to the light incident surface.

* * * * *